July 11, 1939.  M. L. CHAPPELL  2,165,536

MINIATURE AIRPLANE WHEEL

Filed July 30, 1937

INVENTOR.
M. L. CHAPPELL
BY
ATTORNEY.

Patented July 11, 1939

2,165,536

UNITED STATES PATENT OFFICE 2,165,536

MINIATURE AIRPLANE WHEEL

Martin L. Chappell, Los Angeles, Calif.

Application July 30, 1937, Serial No. 156,538

3 Claims. (Cl. 152—29)

This invention relates to combined streamline model airplane wheels.

The general object of the invention is to provide an improved airplane wheel which is particularly adapted for use on miniature and model airplanes.

A more specific object of the invention is to provide a novel wheel including a unitary hub member and tire which are of novel construction.

Another object of the invention is to provide a novel hub member for a miniature airplane wheel.

Another object of the invention is to provide a novel inflating and deflating valve which is particularly adapted for use with miniature airplane wheels.

Other objects and the advantages of my invention will be apparent from the following description taken in connection with the accompanying drawing, wherein.

Figure 1:
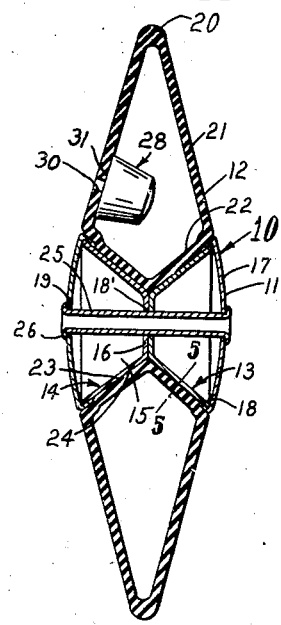
Fig. 1 is a central, sectional view through a miniature wheel embodying the features of my invention.
Figure 2:
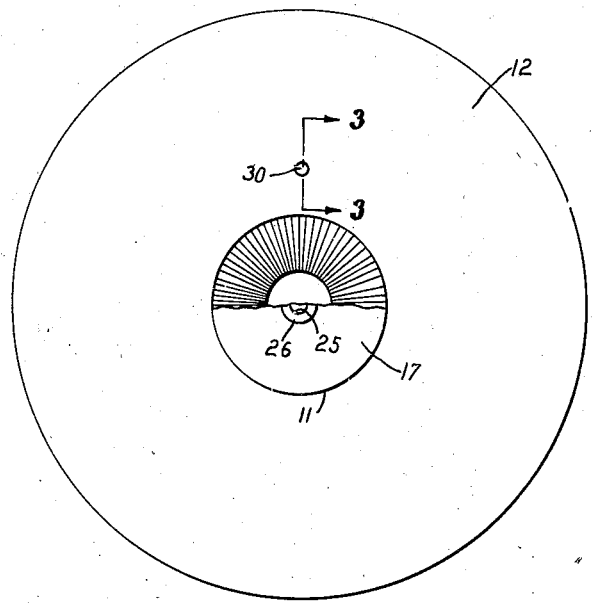
Fig. 2 is a face view of the complete wheel with parts broken away.

Referring to the drawing by reference characters I have shown my invention as embodied in a wheel which is indicated generally at 10. As shown this wheel includes a hub member 11 and a tire 12 which are united to form a permanent unit.

The hub member 11 comprises a pair of members which are indicated generally at 13 and 14. These members are similar and each comprises a frusto-conical cup shaped portion 15 having a plane bottom 16 integral therewith. Each of the cup shaped members has an outer closure 17 thereon the edge 18 of which is turned over to engage the frusto-conical portion to hold the closures in place. The portions 16 are each provided with an aperture 18' while the closures each has an aperture 19.

The tire, as indicated at 12, includes a rubber body having a tread 20 which is preferably slightly thickened and a side wall 21 and has an inner periphery 22. The inner periphery 22 is formed by two frusto-conical portions thus forming an outer surface 23 which is V-shaped in cross section and which engages the V-shaped outer surface 24 on the hub member.

Figure 6:
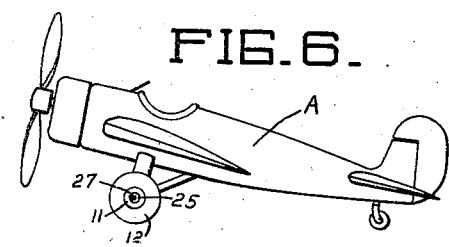
Fig. 6 is a side elevation on a reduced scale showing my wheel mounted on a miniature airplane.
Figure 5:
Fig. 5 is a section taken on line 5—5 Fig. 1.

The tire is assembled as shown in Fig. 1 with the two hub members in place. A tube 25 is then passed through the apertures 18' and 19 and ends of the tubes are spun over or riveted as at 26 to hold the hub portions on the tire and to hold the whole assembly as a unitary structure. The interior of the tube 26 forms a bearing for the axle 27 of a miniature airplane as shown at A in Fig. 6.

The tire 12 is preferably hollow and is provided with an inflating and deflating valve 28. This valve includes a body 29 having an aperture 30 thereon. The body has a frusto-conical side wall and has a plane front face 31 which is vulcanized to the inner wall of the tire at its outer periphery as shown in the drawing.

Figure 3:
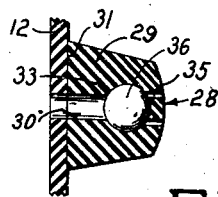
Fig. 3 is a sectional view taken on line 3—3 Fig. 2.
Figure 4:
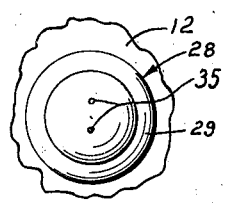
Fig. 4 is a top plan view of the valve.
Figure 7:
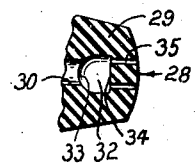
Fig. 7 is a fragmentary detail.

Within the body 29 a chamber 32 is provided which has a semi-spherical wall 33 and a plane wall 34 from which inlet holes 35 lead to the end of the valve. A ball 36 is disposed in the valve as shown in Fig. 3.

The inner periphery of the tire is shown as roughened or rubbed as at 40a and the outer periphery of the hub is roughened or rubbed as at 40b to prevent slipping.

In use the valve is installed as shown in the drawing and air from a suitable source is forced through the aperture 30. This air runs around the ball valve 36 and through the inlet holes 35 into the tire. When the desired pressure is secured in the tire the source of air is removed whereupon the internal pressure against the end of the valve 36 forces the latter to sealing position. To deflate the tire an implement may be inserted in the aperture 30 and the ball 36 forced to one side of its seat thus allowing the air to be released.

From the foregoing description it will be apparent that I have invented a novel airplane wheel which can be economically manufactured and which is highly efficient for its intended purpose.

Having thus described my invention I claim:

1. In a miniature airplane wheel, a hub, said hub comprising a pair of hollow members, each of said members including a frusto-conical cup shaped inner portion having a plane bottom thereon, said bottoms being in engagement, each member having a closure thereon, each of said closures having a flange engaging the outer portion of the cup shaped members, each of said closures and said bottoms having an aperture therethrough, said apertures being in alignment, a tube extending through said apertures, said tube having its ends rolled over onto the outer surface of said closures, said cup shaped members forming a V-shaped groove in the periphery of the hub and a tire having a V-shaped inner periphery fitting said V-shaped groove.

2. In a miniature airplane wheel, a hub, said hub comprising a pair of hollow members, each of said members including a cup shaped inner portion having a bottom thereon, said bottom portions being in engagement, each member having a closure thereon, each of said closures having a portion engaging the outer portion of the cup shaped members, each of said closures and said bottoms having an aperture therethrough, said apertures being in alignment, a tube extending through said apertures, said tube having its ends engaging said closures, said cup shaped members forming a V-shaped groove in the periphery of the hub and a tire having a V-shaped inner periphery fitting said V-shaped groove.

3. In a miniature airplane wheel, a hub member, said hub member comprising a pair of cup shaped members, each of said cup shaped members having an inner end portion and an outer end portion, a hollow tube extending through and engaging said end portions to said cup shaped members, said hub member having a groove in its periphery and a tire, said tire having an inner periphery which corresponds in cross section to the shape of the hub periphery, the outer ground engaging periphery of said tire being thicker than the side walls and having a rounded outer surface to form a narrow ground contacting tread.

MARTIN L. CHAPPELL.